(12) United States Patent
Chun et al.

(10) Patent No.: US 10,414,841 B2
(45) Date of Patent: *Sep. 17, 2019

(54) MODIFIED CONJUGATED DIENE-BASED POLYMER, METHOD FOR PREPARING THE SAME AND RUBBER COMPOSITION INCLUDING THE SAME

(71) Applicant: LG Chem, Ltd., Seoul (KR)

(72) Inventors: Moon Seok Chun, Daejeon (KR); Soo Yong Lee, Daejeon (KR); Seong Du Lee, Daejeon (KR); No Ma Kim, Daejeon (KR); Kyung An Kwon, Daejeon (KR)

(73) Assignee: LG Chem, Ltd. (KR)

( * ) Notice: Subject to any disclaimer, the term of this patent is extended or adjusted under 35 U.S.C. 154(b) by 120 days.

This patent is subject to a terminal disclaimer.

(21) Appl. No.: 15/546,119

(22) PCT Filed: Oct. 7, 2016

(86) PCT No.: PCT/KR2016/011276
§ 371 (c)(1),
(2) Date: Jul. 25, 2017

(87) PCT Pub. No.: WO2017/061831
PCT Pub. Date: Apr. 13, 2017

(65) Prior Publication Data
US 2018/0016369 A1    Jan. 18, 2018

(30) Foreign Application Priority Data
Oct. 8, 2015    (KR) .................... 10-2015-0141830

(51) Int. Cl.
| | |
|---|---|
| C08C 19/44 | (2006.01) |
| C08F 36/16 | (2006.01) |
| C08L 9/00 | (2006.01) |
| C08G 79/12 | (2006.01) |
| C08K 3/36 | (2006.01) |
| B60C 1/00 | (2006.01) |
| C08F 36/14 | (2006.01) |
| C08K 3/04 | (2006.01) |
| C08F 236/04 | (2006.01) |
| C08F 236/06 | (2006.01) |

(52) U.S. Cl.
CPC .............. *C08F 36/16* (2013.01); *B60C 1/00* (2013.01); *C08C 19/44* (2013.01); *C08F 36/14* (2013.01); *C08F 236/04* (2013.01); *C08F 236/06* (2013.01); *C08G 79/12* (2013.01); *C08K 3/04* (2013.01); *C08K 3/36* (2013.01); *C08L 9/00* (2013.01)

(58) Field of Classification Search
CPC ........ C08F 36/16; C08F 36/14; C08F 236/06; C08F 236/04; C08L 9/00; C08K 3/36; C08K 3/04; C08G 79/12; C08C 19/44; B60C 1/00

USPC ........................................................ 524/572
See application file for complete search history.

(56) References Cited

U.S. PATENT DOCUMENTS

| | | | |
|---|---|---|---|
| 4,397,994 A | 8/1983 | Takeuchi et al. | |
| 5,128,416 A | 7/1992 | Imai et al. | |
| 9,598,508 B2* | 3/2017 | Chun | ....................... C08F 36/04 |
| 9,834,619 B2* | 12/2017 | Chun | ....................... C08C 19/25 |
| 2002/0022704 A1 | 2/2002 | Giebeler et al. | |
| 2010/0152369 A1 | 6/2010 | Shibata et al. | |
| 2010/0317794 A1 | 12/2010 | Tanaka et al. | |
| 2010/0317818 A1 | 12/2010 | Hogan et al. | |
| 2011/0172344 A1 | 7/2011 | Yoshida et al. | |

FOREIGN PATENT DOCUMENTS

| | | | |
|---|---|---|---|
| EP | 0341496 A2 | 11/1989 | |
| EP | 2130841 A1 | 12/2009 | |
| EP | 2130842 A1 | 12/2009 | |
| EP | 2338919 A1 | 6/2011 | |
| EP | 2581391 A1 | 4/2013 | |
| EP | 2647657 A1 | 10/2013 | |
| JP | H01284503 A | 11/1989 | |
| JP | 2625876 B2 | 7/1997 | |
| JP | 2000169631 A | * | 6/2000 |
| JP | 201637543 A | 3/2016 | |
| KR | 20090091807 A | 8/2009 | |
| KR | 20090122473 A | 11/2009 | |
| KR | 20100051789 A | 5/2010 | |
| KR | 20110070871 A | 6/2011 | |
| WO | 2008123164 A1 | 10/2008 | |

OTHER PUBLICATIONS

JP 2000-169631 A, machine translation, JPO Japan Platform for Patent Information (J-PlatPat). (Year: 2000).*
Search report from International Application No. PCT/KR2016/011276, dated Jan. 12, 2017.
Extended European Search Report for Application No. EP16853947 dated Dec. 8, 2017.

* cited by examiner

*Primary Examiner* — Josephine L Chang
(74) *Attorney, Agent, or Firm* — Lerner, David, Littenberg, Krumholz & Mentlik, LLP

(57) ABSTRACT

The present disclosure relates to a modified conjugated diene-based polymer having excellent affinity with a filler, a method for preparing the same, a rubber composition including the same and a tire manufactured using the rubber composition. The modified conjugated diene-based polymer according thereto has a tin-based compound-derived group bind on one end, and a silane-based compound-derived group bind on the other end, and therefore, may have excellent affinity with a carbon black-based filler as well as a silica-based filler. Accordingly, a rubber composition including the modified conjugated diene-based polymer may have excellent processability, and as a result, processed goods (for example, tires) manufactured using the rubber composition may have excellent tensile strength, wear resistance and viscoelastic property.

20 Claims, No Drawings

MODIFIED CONJUGATED DIENE-BASED POLYMER, METHOD FOR PREPARING THE SAME AND RUBBER COMPOSITION INCLUDING THE SAME

CROSS-REFERENCE TO RELATED APPLICATIONS

This present application is a national phase entry under 35 U.S.C. § 371 of International Application No. PCT/KR2016/011276, filed on Oct. 7, 2016, which claims priority from Korean Patent Application No. 10-2015-0141830, filed with the Korean Intellectual Property Office on Oct. 8, 2015, the disclosures of which are incorporated herein by reference.

FIELD OF THE INVENTION

The present disclosure relates to a modified conjugated diene-based polymer having excellent affinity with a filler, a method for preparing the same, a rubber composition including the same and a tire manufactured using the rubber composition.

DESCRIPTION OF THE RELATED ART

With recent demands for fuel efficiency in vehicles, conjugated diene-based polymers having small rolling resistance, excellent wear resistance and tensile properties, and also having handling stability represented by wet skid resistance have been required as a rubber material for tires.

In order for reducing rolling resistance of a tire, a method of reducing a hysteresis loss of vulcanized rubber may be used, and as evaluation indexes of such vulcanized rubber, rebound resilience at 50° C. to 80° C., tan δ, Goodrich heating and the like are used. In other words, rubber materials having large rebound resilience or having small tan δ or Goodrich heating at the above-mentioned temperature are preferred.

As rubber materials having a small hysteresis loss, natural rubber, polyisoprene rubber, polybutadiene rubber or the like is known, however, these have a problem in that wet skid resistance is low. Accordingly, conjugated diene-based (co)polymers such as styrene-butadiene rubber (hereinafter, referred to as SBR) or butadiene rubber (hereinafter, referred to as BR) have been prepared by emulsion polymerization or solution polymerization, and used as rubber for tires recently. Of these, the biggest advantage that solution polymerization has compared to emulsion polymerization is that vinyl structure content and styrene content defining rubber properties are capable of being arbitrarily controlled, and molecular weights, properties and the like are capable of being controlled by coupling, modification or the like. Accordingly, structures of finally prepared SBR or BR rubber may readily change, movement at the end of the chain is reduced by binding or modification at the end of the chain, and binding strength with a filler such as silica or carbon black may increase, and as a result, SBR rubber prepared by solution polymerization is much used as a rubber material for tires.

When such solution-polymerized SBR is used as a rubber material for tires, a glass transition temperature of rubber increases by increasing vinyl content in the SBR, and properties required for tires such as drive resistance and braking power are capable of being controlled, and in addition thereto, fuel consumption may be reduced by properly controlling the glass transition temperature.

The solution-polymerized SBR is prepared using an anion polymerization initiator, and the end of the formed polymer chain is bound or modified using various modifiers.

For example, U.S. Pat. No. 4,397,994 discloses a technology of binding an active anion at the end of a polymer chain obtained through polymerizing styrene-butadiene under a non-polar solvent using an alkyl lithium, a monofunctional initiator, with a binding agent such as a tin compound.

Meanwhile, carbon black, silica and the like have been used as a reinforcing filler of a tire tread, and using silica as a reinforcing filler has an advantage in that a hysteresis loss is small and wet skid resistance is enhanced. However, silica with a hydrophilic surface has a disadvantage of having lower affinity with rubber compared to carbon black with a hydrophobic surface, which leads to inferior dispersibility, and a separate silane coupling agent needs to be used for improving dispersibility or providing binding between silica-rubber.

In view of the above, measures of introducing a functional group having affinity or reactivity with silica at the end of a rubber molecule have been made, however, the effects are not sufficient.

In addition, when enhancing affinity for only silica, affinity with carbon black is relatively reduced, and this may cause limits in the scope of application.

Accordingly, development of rubber having high affinity with carbon black as well as silica has been required.

PRIOR ART DOCUMENTS (Patent Document 1) U.S. Pat. No. 4,397,994 A

DISCLOSURE OF THE INVENTION

Technical Problem

The present disclosure has been made in view of the above, and is directed to providing a modified conjugated diene-based polymer having excellent affinity with a filler.

The present disclosure is also directed to providing a method for preparing the modified conjugated diene-based polymer.

The present disclosure is also directed to providing a rubber composition including the modified conjugated diene-based polymer.

Furthermore, the present disclosure is also directed to providing a tire manufactured using the rubber composition.

Technical Solution

In view of the above, one embodiment of the present disclosure provides a modified conjugated diene-based polymer represented by the following Chemical Formula 1.

[Chemical Formula 1]

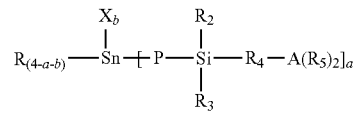

In Chemical Formula 1,

R, $R_4$ and $R_5$ are each independently a hydrocarbon group having 1 to 20 carbon atoms, $R_2$ and $R_3$ are each independently a hydrocarbon group having 1 to 20 carbon atoms or a hydrocarbon group having 1 to 20 carbon atoms containing oxygen or nitrogen, $R_2$ and $R_3$ may be linked to each other to form an aliphatic ring having 5 to 20 carbon atoms or an aromatic ring having 6 to 20 carbon atoms, P is a modified conjugated diene-based polymer chain, X is a halogen group, A is a tertiary amine, a and b are each independently an integer of 1 to 4, and a+b≤4.

Another embodiment of the present disclosure provides a method for preparing the modified conjugated diene-based polymer represented by the following Chemical Formula 1, the method including preparing an active polymer having alkali metals bind on both ends by polymerizing a conjugated diene-based monomer, or an aromatic vinyl-based monomer and a conjugated diene-based monomer in a hydrocarbon solvent under the presence of a multifunctional anion polymerization initiator (step 1); reacting the polymer with a tin-based compound represented by the following Chemical Formula 2 (step 2); and, after the reaction, reacting the result with an aminosilane-based compound represented by the following Chemical Formula 3 (step 3).

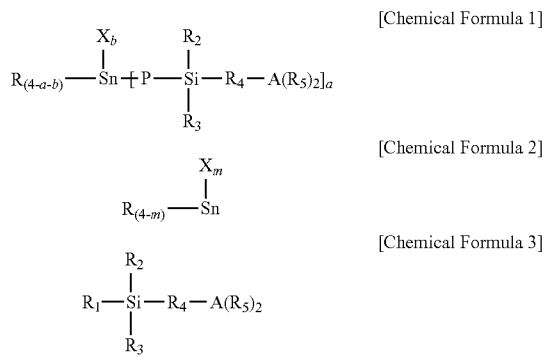

[Chemical Formula 1]

[Chemical Formula 2]

[Chemical Formula 3]

In Chemical Formula 1, Chemical Formula 2 or Chemical Formula 3,

R, $R_4$ and $R_5$ are each independently a hydrocarbon group having 1 to 20 carbon atoms, $R_1$, $R_2$ and $R_3$ are each independently a hydrocarbon group having 1 to 20 carbon atoms; or a hydrocarbon group having 1 to 20 carbon atoms containing oxygen or nitrogen, $R_2$ and $R_3$ may be linked to each other to form an aliphatic ring having 5 to 20 carbon atoms or an aromatic ring having 6 to 20 carbon atoms, P is a modified conjugated diene-based polymer chain, X is a halogen group, A is a tertiary amine, a, b and m are each independently an integer of 1 to 4, and a+b≤4.

Still another embodiment of the present disclosure provides a rubber composition including the modified conjugated diene-based polymer, and a tire manufactured using the rubber composition.

Advantageous Effects

A modified conjugated diene-based polymer according to the present disclosure has a tin-based compound-derived group bind on one end, and a silane-based compound-derived group bind on the other end, and therefore, can have excellent affinity with a carbon black-based filler as well as a silica-based filler. Accordingly, a rubber composition including the modified conjugated diene-based polymer can have excellent processability, and as a result, processed goods (for example, tires) manufactured using the rubber composition can have excellent tensile strength, wear resistance and viscoelastic property.

MODE FOR CARRYING OUT THE INVENTION

Hereinafter, the present disclosure will be described in more detail in order to illuminate the present disclosure.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

The present disclosure provides a modified conjugated diene-based polymer with improved processability by having excellent affinity with a carbon black-based filler as well as a silica-based filler.

The modified conjugated diene-based polymer according to one embodiment of the present disclosure is a compound represented by the following Chemical Formula 1.

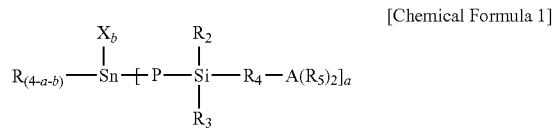

[Chemical Formula 1]

In Chemical Formula 1,

R, $R_4$ and $R_5$ are each independently a hydrocarbon group having 1 to 20 carbon atoms, $R_2$ and $R_3$ are each independently a hydrocarbon group having 1 to 20 carbon atoms or a hydrocarbon group having 1 to 20 carbon atoms containing oxygen or nitrogen, $R_2$ and $R_3$ may be linked to each other to form an aliphatic ring having 5 to 20 carbon atoms or an aromatic ring having 6 to 20 carbon atoms, P is a modified conjugated diene-based polymer chain, X is a halogen group, A is a tertiary amine, a and b are each independently an integer of 1 to 4, and a+b≤4.

Specifically, in Chemical Formula 1, R, $R_4$ and $R_5$ are each independently an alkyl group having 1 to 10 carbon atoms, $R_2$ and $R_3$ are each independently an alkyl group having 1 to 10 carbon; an alkyl group having 1 to 10 carbon atoms containing oxygen; or an alkyl group having 1 to 10 carbon atoms containing nitrogen.

More specifically, in Chemical Formula 1, R, $R_4$ and $R_5$ are each independently an alkyl group having 1 to 6 carbon atoms, $R_2$ and $R_3$ are each independently an alkyl group having 1 to 6 carbon atoms or an alkyl group having 1 to 6 carbon atoms containing oxygen.

In addition, in Chemical Formula 1, X may be selected from among F, Cl, Br and I.

The modified conjugated diene-based polymer according to one embodiment of the present disclosure may have, as shown in the structure of Chemical Formula 1, a tin-based compound-derived group represented by Chemical Formula 2 to be described later bind on one end of the polymer, and an aminosilane-based compound-derived group represented by Chemical Formula 3 to be described later bind on the other end. In other words, the modified conjugated diene-based polymer according to one embodiment of the present disclosure may have different functional groups bind on both ends.

Specifically, the modified conjugated diene-based polymer may contain 50 ppm to 550 ppm of tin (Sn) and 80 ppm to 700 ppm of silica (Si). Herein, the tin may be one component forming the tin-based compound-derived group, and the silica may be one component forming the aminosilane-based compound-derived group.

The modified conjugated diene-based polymer has a tin-based compound-derived group bind on one end and an aminosilane-based compound-derived group bind on the other end as described above, and thereby may have excellent affinity with a carbon black-based filler as well as a silica-based filler. Accordingly, a mixing property with the filler may be excellent, and processability of a rubber composition including the modified conjugated diene-based polymer may be superior, and as a result, tensile strength and viscoelastic properties of formed products manufactured using the rubber composition, for example, tires, may be improved.

Meanwhile, the modified conjugated diene-based polymer may be a homopolymer of a conjugated diene-based monomer, or a copolymer of a conjugated diene-based monomer and an aromatic vinyl-based monomer.

When the modified conjugated diene-based polymer is a copolymer of a conjugated diene-based monomer and an aromatic vinyl-based monomer, the copolymer may be a random copolymer.

In the present disclosure, the term "random copolymer" may indicate constituent units forming a copolymer being disorderedly arranged.

The conjugated diene-based monomer is not particularly limited, and examples thereof may include one or more types selected from the group consisting of 1,3-butadiene, 2,3-dimethyl-1,3-butadiene, piperylene, 3-butyl-1,3-octadiene, isoprene and 2-phenyl-1,3-butadiene.

When the modified conjugated diene-based polymer is a copolymer of a conjugated diene-based monomer and an aromatic vinyl-based monomer, the modified conjugated diene-based polymer may include the conjugated diene-based monomer-derived unit in 60% by weight or greater, specifically in 60% by weight to 90% by weight and more specifically in 60% by weight to 85% by weight.

The aromatic vinyl-based monomer is not particularly limited, and examples thereof may include one or more types selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene and 1-vinyl-5-hexylnaphthalene.

When the modified conjugated diene-based polymer is a copolymer of a conjugated diene-based monomer and an aromatic vinyl-based monomer, the modified conjugated diene-based polymer may include the aromatic vinyl-based monomer-derived unit in 40% by weight or less, specifically in 10% by weight to 40% by weight and more specifically in 15% by weight to 40% by weight.

In the present disclosure, the term "derived unit" may indicate a component or a structure resulting from a certain material, or the material itself.

In addition, the modified conjugated diene-based polymer may have Mooney viscosity of 50 or greater, specifically 50 to 150 and more specifically 60 to 120.

The modified conjugated diene-based polymer may have a number average molecular weight of 50,000 g/mol to 700,000 g/mol, specifically 100,000 g/mol to 500,000 g/mol and more specifically 150,000 g/mol to 400,000 g/mol.

The modified conjugated diene-based polymer may have a weight average molecular weight of 250,000 g/mol to 1,600,000 g/mol.

The modified conjugated diene-based polymer may have vinyl content of 5% or higher, specifically 10% or higher and more specifically 10% to 50%, and in this range, a glass transition temperature of the polymer may be controlled to a proper range, which satisfies properties required for tires such as drive resistance and braking power when used in tires, and is also effective in reducing fuel consumption.

Herein, the vinyl content means content of a 1,2-added conjugated diene-based monomer rather than a 1,4-added with respect to 100% by weight of the conjugated diene-based polymer formed with a monomer having a vinyl group and an aromatic vinyl-based monomer.

The modified conjugated diene-based polymer may have a PDI of 1.5 to 3.5, specifically 1.7 to 3.2 and more specifically 2.0 to 3.0.

As for a viscoelasticity property, the modified conjugated diene-based polymer has a Tan δ value at 0° C. (Tan δ at 0° C.) of 0.60 to 1.20 or 0.70 to 1.00 when measuring with 10 Hz through DMA after mixing with silica, and in this range, road resistance or humidity resistance is greatly enhanced compared to existing inventions.

In addition, a Tan δ value at 60° C. (Tan δ at 60° C.) may be 0.08 to 0.14 or 0.09 to 0.13, and in this range, rolling resistance or rotation resistance (RR) is greatly enhanced compared to existing inventions.

Another embodiment of the present disclosure provides a method for preparing the modified conjugated diene-based polymer.

The preparation method according to one embodiment of the present disclosure includes preparing an active polymer having alkali metals bind on both ends by polymerizing a conjugated diene-based monomer, or an aromatic vinyl-based monomer and a conjugated diene-based monomer in a hydrocarbon solvent under the presence of a multifunctional anion polymerization initiator (step 1); reacting the polymer with a tin-based compound represented by the following Chemical Formula 2 (step 2); and, after the reaction, reacting the result with an aminosilane-based compound represented by the following Chemical Formula 3 (step 3).

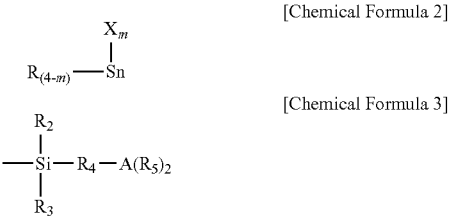

In Chemical Formula 2 or Chemical Formula 3,

R, $R_4$ and $R_5$ are each independently a hydrocarbon group having 1 to 20 carbon atoms, $R_1$, $R_2$ and $R_3$ are each independently a hydrocarbon group having 1 to 20 carbon atoms; a hydrocarbon group having 1 to 20 carbon atoms containing oxygen; or a hydrocarbon group having 1 to 20 carbon atoms containing nitrogen, $R_2$ and $R_3$ may be linked to each other to form an aliphatic ring having 5 to 20 carbon atoms or an aromatic ring having 6 to 20 carbon atoms, X is a halogen group, A is a tertiary amine, and m is an integer of 1 to 4.

The step 1 is a step for preparing an active polymer having alkali metals bind on both ends, and may be carried out by polymerizing a conjugated diene-based monomer, or an aromatic vinyl-based monomer and a conjugated diene-based monomer in a hydrocarbon solvent under the presence of a multifunctional anion polymerization initiator.

In the present disclosure, the term "active polymer having alkali metals bind on both ends" may indicate a polymer in which anions on both ends of the polymer and alkali metal cations bind.

As described above, the polymerization of the step 1 may use a conjugated diene-based monomer alone or both an aromatic vinyl-based monomer and a conjugated diene-based monomer as a monomer. In other words, the polymer prepared through the preparation method according to one embodiment of the present disclosure may be a homopolymer derived from a conjugated diene-based monomer, or a copolymer derived from an aromatic vinyl-based monomer and a conjugated diene-based monomer.

Specific types of the conjugated diene-based monomer and the aromatic vinyl-based monomer may be as described above. In addition, the amount of each of the monomers used is not particularly limited and each of the monomers may be used in an amount so that the content of the conjugated diene-based monomer-derived unit and the aromatic vinyl-based monomer-derived unit in the modified conjugated diene-based polymer is the same as described above.

The hydrocarbon solvent is not particularly limited, and examples thereof may include one or more types selected from the group consisting of n-pentane, n-hexane, n-heptane, isooctane, cyclohexane, toluene, benzene and xylene.

The multifunctional anion polymerization initiator may be used in 0.10 parts by weight to 0.50 parts by weight based on a total of 100 parts by weight of the monomer. The multifunctional anion polymerization initiator may be prepared by reacting an aromatic compound and an organolithium compound in a hydrocarbon solvent. Herein, the aromatic compound and the organolithium compound may be reacted in a molar ratio of 1:1 to 2.

The aromatic compound used in the preparation of the multifunctional anion polymerization initiator may include one or more types selected from the group consisting of o-diisopropenylbenzene, m-diisopropenylbenzene, p-diisopropenylbenzene, o-divinylbenzene, m-divinylbenzene, p-divinylbenzene, 1,2,4-trivinylbenzene, 1,2-vinyl-3,4-dimethylbenzene, 1,3-divinylnaphthalene, 1,3,5-trivinylnaphthalene, 2,4-divinylbiphenyl, 3,5,4'-trivinylbiphenyl, 1,2-divinyl-3,4-dimethylbenzene and 1,5,6-trivinyl-3,7-diethylnaphthalene, but is not limited thereto.

The organolithium compound used in the preparation of the multifunctional anion polymerization initiator may include one or more types selected from the group consisting of ethyllithium, propyllithium, n-butyllithium, s-butyllithium, t-butyllithium, hexyllithium, phenyllithium, lithium acetylamide and lithium isopropylamide, but is not limited thereto.

The hydrocarbon solvent used in the preparation of the multifunctional anion polymerization initiator may be the same as described above.

In addition, a Lewis base may be further used when preparing the multifunctional anion polymerization initiator for facilitating the production of or stabilizing the initiator. Herein, the Lewis base is not particularly limited, and may be used in an amount of 30 ppm to 70,000 ppm with respect to the hydrocarbon solvent.

As the Lewis base, for example, tertiary amines, tertiary diamines, chain-type or cyclic ethers and the like may be used. The tertiary amine may include trimethylamine, triethylamine, methyldiethylamine, 1,1-dimethoxytrimethylamine, 1,1-diethoxytrimethylamine, 1,1-diethoxy triethylamine, N,N-dimethylformamide diisopropyl acetal, N,N-dimethylformamide dicyclohexyl acetal and the like.

The tertiary diamine may include N,N,N',N'-tetramethyldiaminomethane, N,N,N',N'-tetramethylethylenediamine, N,N,N',N'-tetramethylpropanediamine, N,N,N',N'-tetramethyldiaminobutane, N,N,N',N'-tetramethyldiaminopentane, N,N,N',N'-tetramethylhexanediamine, dipiperidinopentane, dipiperidinoethane and the like.

The chain-type ether may include dimethyl ether, diethyl ether, ethylene glycol dimethyl ether, diethylene glycol dimethyl ether, triethylene glycol dimethyl ether, tetraethylene dimethyl ether and the like.

The cyclic ether may include tetrahydrofuran, bis(2-oxolanyl)ethane, 2,2-bis(2-oxolanyl)propane, 1,1-bis(2-oxolanyl)ethane, 2,2-bis(2-oxolanyl)butane, 2,2-bis(5-methyl-2-oxolanyl)propane, 2,2-bis(3,4,5-trimethyl-2-oxolanyl) propane and the like.

The multifunctional anion polymerization initiator may be prepared through a reaction under a temperature condition of 50° C. or lower, specifically −20° C. to 30° C.

When carrying the polymerization of the step 1, a polar additive may be further added, and the polar additive may be added in 0.001 parts by weight to 5.0 parts by weight with respect to a total of 100 parts by weight of the monomer. Specifically, the polar additive may be added in 0.005 parts by weight to 3.0 parts by weight with respect to a total of 100 parts by weight of the monomer.

The polar additive may include one or more types selected from the group consisting of tetrahydrofuran, ditetrahydrofurylpropane, diethyl ether, cycloamyl ether, dipropyl ether, ethylenedimethyl ether, diethylene glycol, dimethyl ether, tertiary butoxyethoxyethane bis(3-dimethylaminoethyl) ether, (dimethylaminoethyl)ethyl ether, trimethylamine, triethylamine, tripropylamine and tetramethylethylenediamine.

By using the polar additive in the preparation method according to one embodiment of the present disclosure, differences in the reaction rates of the conjugated diene-based monomer and the aromatic vinyl-based monomer are compensated when copolymerizing these, and as a result, the random copolymer may be induced to be readily formed.

The polymerization of the step 1 may be carried out through adiabatic polymerization or isothermal polymerization.

Herein, the adiabatic polymerization indicates a polymerization method including polymerizing with heat of the reaction itself without arbitrarily applying heat after introducing the multifunctional anion polymerization initiator, and the isothermal polymerization indicates a polymerization method of maintaining a constant polymer temperature by arbitrarily applying or taking away heat after introducing the multifunctional anion polymerization initiator.

The polymerization may be carried out in a temperature range of −20° C. to 200° C., specifically 0° C. to 150° C. and more specifically, carried out in a temperature range of 10° C. to 120° C.

The step 2 is a step of reacting the polymer with a tin-based compound represented by Chemical Formula 2 in order to bind the tin-based compound-derived group on one end of the active polymer having alkali metals on both ends.

Specifically, the tin-based compound represented by Chemical Formula 2 may include one or more types selected from the group consisting of methyl trichlorotin, dimethyl dichlorotin, ethyl trichlorotin, diethyl dichlorotin, butyl trichlorotin, dibutyl dichlorotin, octyl trichlorotin, dioctyl dichlorotin, methyl tribromotin, dimethyl dibromotin, octyl tribromotin, dioctyl dibromotin, tetrachlorotin, tetrabromotin, tetraiodotin, cyclohexyl trichlorotin and phenyl trichlorotin.

The tin-based compound may be used in a ratio such that tin in the tin-based compound is in 0.05 mol to 0.25 mol per 1 mol of lithium in the multifunctional anion polymerization initiator.

The step 3 is a step of reacting the polymer with an aminosilane-based compound represented by Chemical Formula 3 in order to bind the aminosilane-based compound-derived group on the other end of the polymer having the tin-based compound-derived group bind on one end.

Specifically, the aminosilane-based compound represented by Chemical Formula 3 may include 3-(diethoxy(methyl)silyl)-N,N-diethylpropane-1-amine or 2-(N,N-dimethylaminopropyl)2,5,5-trimethyl-1,3,2-dioxysilane.

The silane-based compound may be used in a ratio such that silica in the aminosilane-based compound is in 0.1 mol to 1.0 mol per 1 mol of lithium in the multifunctional anion polymerization initiator.

Each of the reactions in the step 2 and step 3 is a modification reaction for binding functional groups on both ends of the polymer, and each of the reactions may be carried out for 10 minutes to 5 hours in a temperature range of 10° C. to 120° C.

The preparation method according to one embodiment of the present disclosure may further include one or more steps of solvent and unreacted monomer collection and drying after the step 3 as necessary.

Moreover, the present disclosure provides a rubber composition including the modified conjugated diene-based polymer.

The rubber composition may include the modified conjugated diene-based polymer in 20% by weight to 90% by weight.

The rubber composition may include a filler in 0.1 parts by weight to 200 parts by weight with respect to 100 parts by weight of the modified conjugated diene-based polymer, and the filler may be a silica-based filler, a carbon black-based filler or a combination thereof.

In addition, the rubber composition may further include other diene-based polymers as necessary in addition to the modified conjugated diene-based polymer, and the diene-based polymers may be, for example, a styrene-butadiene polymer, a butadiene polymer, natural rubber or a combination thereof.

Moreover, the present disclosure provides a tire manufactured using the rubber composition.

The tire may include a tire or a tire tread.

Hereinafter, the present disclosure will be described in more detail with reference to examples and test examples. However, the following examples and test examples are for illustrative purposes only, and the scope of the present disclosure is not limited thereto.

EXAMPLE 1

1) Preparation of Multifunctional Anion Polymerization Initiator (t-buLi/1,3-diisopropenylbenzene adduct)

A 2.5 L reactor equipped with a stirrer and a jacket was dried with nitrogen in advance, and the temperature was set to −10° C. Thereto, 47.5 g (99.5%, 0.467 mol) of triethylamine, 332.5 g (18%, 0.934 mol) of t-butyllithium and 466.6 g of cyclohexane were consecutively introduced, and the result was stirred and mixed. After that, 76.2 g (97%, 0.467 mol) of 1,3-diisopropenylbenzene was added thereto and reacted, the temperature was raised to room temperature, and the result was stirred for 2 hours to prepare 922.8 g (14.5%) of a multifunctional anion polymerization initiator.

2) Preparation of Modified Conjugated Diene-based Polymer

Four 10 L reactors equipped with a stirrer and a jacket were connected in series, dried with nitrogen in advance, and then butadiene (292 g/hr), styrene (108 g/hr), hexane (2000 g/hr) and tetramethylethylenediamine (TMEDA) (1.04 g/hr) as a polar additive, of which impurities were removed in advance, were continuously introduced to the first reactor. The multifunctional anion polymerization initiator of 1) was introduced thereto at 1.07 g/hr. Herein, the temperature inside the reactor was maintained at 80° C. and the reaction time was set to 40 minutes. The second reactor was also at 80° C. and the reaction time was 60 minutes. While going through the second reactor, 99% or higher of the butadiene and the styrene was consumed, however, the third reactor and the fourth reactor were also used in order to prepare a polymer under the same condition as other comparative polymers.

In between the second reactor and the third reactor, tetrachlorotin was introduced in a molar ratio of 0.25 times with respect to a molar number of the used anion polymerization initiator, and a tin coupling reaction was employed to occur in the third reactor.

Subsequently, for a modification reaction, 3-(diethoxy(methyl)silyl)-N,N-diethylpropane-1-amine was introduced in a molar ratio of 1.0 time with respect to a molar number of the used anion polymerization initiator in between a transfer of the polymer from the third reactor to the fourth reactor, and an end modification reaction was carried out in the fourth reactor.

The temperatures of the third reactor and the fourth reactor were each 75° C., and the time the polymer stayed in the reactors was set to 30 minutes each. To the reaction material coming out of the fourth reactor, 2,6-di-t-butyl-p-cresol (BHT) was added at 4.0 g/hr, the solvent was removed through steam stripping, and the result was roll mill dried to obtain a modified conjugated diene-based polymer, and the modified conjugated diene-based polymer has a tin-based compound-derived group bind on one end, and an aminosilane-based compound-derived group bind on the other end.

The occurrence of the tin coupling reaction was identified from a difference between Mooney viscosity of the polymer in the second reactor and Mooney viscosity of the polymer in the third reactor. In other words, it was determined that the coupling reaction with the tin occurred when Mooney viscosity increased.

In addition, determination of whether the modification reaction was progressed using a modifier was identified from measuring an amount of rubber that was not dissolved when mixing the polymer with silica or silica-carbon black-mixed reinforcing agent and then precipitating the mixture prior to crosslinking in a solvent, that is, bound-rubber, and comparing this amount with an amount of bound-rubber of the unmodified conjugated diene-based polymer. In other words, modification was considered to be much progressed as the amount of bound-rubber increased.

As for the bound-rubber measurement, approximately 0.2 g of a mixture completed with mixing with an inorganic reinforcing agent was cut into an approximately 1 mm polygon shape, placed in a 100 mesh wire netting, and weighed, and after immersing the result in toluene for 24 hours, the result was dried and weighed. From the amount of components that remained without being dissolved, the amount of the polymer binding with the filler was calculated, and a ratio of the polymer binding with the filler with respect to the amount of the polymer in the initial mixture was obtained. This value was used as a ratio of modification.

EXAMPLE 2

A modified conjugated diene-based polymer was prepared in the same manner as in Example 1 except that the amount of the tetrachlorotin was reduced to a molar ratio of 0.17 with respect to the polymerization initiator when introduced.

COMPARATIVE EXAMPLE 1

An unmodified conjugated diene-based polymer was prepared in the same manner as in Example 1, except that TMEDA was introduced at 0.64 g/hr and the anion polymerization initiator at 0.690 g/hr, and tetrachlorotin and 3-(diethoxy(methyl)silyl)-N,N-diethylpropane-1-amine were not introduced. However, to the polymer coming out of the fourth reactor, methanol was introduced at 0.5 g/hr to remove activity of the polymer, and then 2,6-di-t-butyl-p-cresol (BHT) was added at 4.0 g/hr.

COMPARATIVE EXAMPLE 2

A modified conjugated diene-based polymer having an aminosilane-based compound-derived group bind on both ends of the polymer was prepared in the same manner as in Example 1, except that TMEDA was introduced at 0.76 g/hr and the anion polymerization initiator at 0.86 g/hr, and tetrachlorotin was not introduced.

COMPARATIVE EXAMPLE 3

A modified conjugated diene-based polymer having an aminosilane-based compound-derived group bind on both ends of the polymer was prepared in the same manner as in Comparative Example 2, except that, in order to identify effects on properties and processability caused by employing the prepared polymer to have narrower molecular weight distribution compared to Comparative Example 2, the temperature in the first reactor was changed to 60° C. and the reaction time to 20 minutes, the reaction time in the second reactor was extended to 80 minutes, and tetramethylethylenediamine (TMEDA) was introduced at 0.38 g/hr and the anion polymerization initiator at 0.75 g/hr.

TEST EXAMPLE 1

For evaluating properties of the polymers of Examples and 2, and Comparative Examples 1 to 3, each of the polymers was mixed with an inorganic filler. Mixing recipes were as in the following Table 1, and property evaluation results are shown in Table 2.

As the mixing equipment, KOBELCO BB_L1600IM Intermeshing-type Banbury mixer was used, and a rubber sheet was prepared at 50° C. with a 6-inch Roll, and it was used in preparing a specimen for property evaluations.

First mixing: chemicals for first mixing of Table 1 such as rubber, silica and stearic acid were introduced to a Banbury mixer, and while starting at a rotor speed of 80 rpm and a temperature of 70° C., the rotor speed was controlled so that the temperature automatically reached 150° C. After reaching 150° C., mixing was continued while maintaining the temperature for 200 seconds, and the first mixing was finished. The first mixture obtained as above was sufficiently cooled for 2 hours or longer at room temperature, and then used for second mixing.

In the first mixing, two types of inorganic fillers, that is, an inorganic filler mixing 50 parts by weight of silica and 20 parts by weight of carbon black and an inorganic filler including 70 parts by weight of silica alone, were used in the mixing.

Second mixing: the sufficiently cooled first mixture was introduced again to the Banbury mixer, and sulfur, a cross-linking agent, and DPG and CZ, crosslinking accelerators, were added thereto, and the result was mixed for 1 minute and 30 seconds at 40 rpm and a mixing temperature of 40° C. After that, the result was formed to a sheet having a thickness of 4 mm using a 6-inch Roll at 50° C., and the sheet was used in preparing a specimen for crosslinking.

Crosslinking of the specimen for property measurements was carried out using a press for a time of 1.3 times of the crosslinking rate (t'90) of each of the mixtures at 160° C.

Rheology properties such as Tg, wet grip (0° C. tan δ) or RR (60° C. tan δ) of the crosslinked rubber were evaluated in a temperature sweep mode in a range of −40° C. to +70° C. using an Eplexor 500 N equipment manufactured by Gabo Instruments of Germany. As for the evaluation condition, the measurements were made under a condition of a temperature raising rate of 2° C./min, frequency of 10 Hz, static strain of 3.5% and dynamic strain of 3.0%.

TABLE 1

| Mixing Agent | Compound Name/Product Name | Parts by Weight (phr) | Note |
|---|---|---|---|
| Rubber | LG SSBR | 100 | First Mixing |
| Silica (Silica + Carbon Black) | Degussa 7000GR (7000GR + HAF) | 70 (50 + 20) | |
| Oil | TDAE | 37.5 | |
| X50S (Degussa) | 50% Carbon Black and 50% Bis(3-triethoxysilylpropyltetra-sulfane) | 11.2 | |
| Stearic Acid | — | 2.0 | |
| ZnO | — | 3.0 | |
| RD | Polymerized 2,2,4-Trimethyl-1,2-dihydroquinoline, Flexsys | 2.0 | |
| 6PPD | N-1,3-Dimethylbutyl-N'-phenyl-p-phenylenediamine, Flexsys | 2.0 | |
| WAX | — | 1.0 | |
| DPG | Diphenylguanidine, Flexsys | 1.75 | Second Mixing |
| Sulfur | — | 1.5 | |
| CZ | N-t-Butyl-2-benzothiazyl Sulfonamide, Flexsys | 2.0 | |

TABLE 2

|  |  | Example 1 | Comparative Example 1 | Comparative Example 2 | Example 1 | Example 2 | Comparative Example 3 |
|---|---|---|---|---|---|---|---|
|  | Modification Method | Tin-based + Aminosilane-based | Unmodified | Aminosilane-based | Tin-based + Aminosilane-based | Tin-based + Aminosilane-based | Aminosilane-based |
|  | Inorganic Filler Type | | Mix (Silica 50 Parts by Weight + Carbon Black 20 Parts by Weight) | | | Silica 70 Parts by Weight | |
| Base Rubber | No. 2 Reactor Mooney Viscosity (ML1 + 4@ 100° C.) | 38.7 | 96.9 | 59.0 | 38.7 | 38.7 | 62.3 |
|  | Final Mooney Viscosity | 98.6 | 98.1 | 64.0 | 98.6 | 70.4 | 68.8 |
|  | SM Content, % | 27.0 | 26.0 | 26.0 | 27.0 | 26.2 | 26.2 |
|  | Vinyl Content, % | 38.3 | 38.5 | 38.2 | 38.3 | 38.3 | 37.0 |
|  | $Mn * 10^5$ | 2.80 | 2.60 | 1.69 | 2.80 | 2.34 | 2.23 |
|  | $Mw * 10^5$ | 8.51 | 7.57 | 4.89 | 8.51 | 6.99 | 5.88 |
|  | MWD | 3.03 | 2.92 | 2.90 | 3.03 | 2.99 | 2.64 |
| Green Compound | Compound Mooney Viscosity | 72 | 115 | 87 | 87 | 63 | 102 |
|  | Δ Mooney viscosity (Comp.-Base) | −26.6 | +16.9 | +23 | −11.6 | −7.4 | +33.2 |
|  | Bound Rubber Index, %100 | 131 | 100 | 123 | 129 | 128 | 137 |
|  | Tc' 90, min | 18.45 | 17.81 | 17.17 | 17.10 | 17.32 | 16.30 |
| Cured Rubber | 300% Modulus Index, % | 105 | 100 | 113 | 95 | 93 | 105 |
|  | Tensile Strength Index % | 115 | 100 | 110 | 107 | 104 | 104 |
|  | Elongation Index, % | 113 | 100 | 102 | 113 | 115 | 104 |
|  | Tg, ° C. | −11.7 | −12.3 | −11.8 | −11.8 | −11.2 | −13.8 |
|  | Wet Grip Index, % (Based on 0° C. tanδ) | 102 | 100 | 106 | 104 | 108 | 103 |
|  | RR Index, % (Based on 60° C. tanδ) | 111 | 100 | 114 | 110 | 107 | 116 |

As seen in Table 2, it was identified that, when there was no tin coupling reaction or 3-(diethoxy(methyl)silyl)-N,N-diethylpropane-1-amine modifier reaction as in Comparative Example 1, almost no differences were observed between Mooney viscosity in the second reactor prior to coupling and Mooney viscosity of the final reaction material, however, when a coupling reaction was implemented with tetrachlorotin as in Examples 1 and 2, a Mooney viscosity difference between the second and the final reaction materials was very large identifying that the tin coupling reaction was well formed.

In addition, carrying out end modification with the aminosilane-based modifier caused a difference in the bound rubber content after mixing with the inorganic filler, and this is due to an interaction between the polar functional group attached on the molecular chain and the inorganic filler, which increases the amount of rubber physicochemically adsorbed to the surface of the inorganic filler. In other words, as modification by the functional group increases, chemical adsorption with silica and the like increases, which result in an increase in the amount of the bound rubber.

When comparing Example 1 and Comparative Examples 1 and 2 using 50 parts by weight of silica and 20 parts by weight of carbon black as a mixed filler, it was seen that Comparative Example 2 modifying both ends with just the 3-(diethoxy(methyl)silyl)-N,N-diethylpropane-1-amine modifier had enhanced tensile property, wet grip property and rolling resistance (RR) property and the like compared to Comparative Example 1 that is an unmodified polymer. However, it was seen that a difference in the Mooney viscosity before and after mixing with the inorganic filler, that is, ΔMooney viscosity, increased compared to the base rubber, and processability was somewhat inferior.

Meanwhile, it was seen that, in Example 1 modifying the molecular chain end with the 3-(diethoxy(methyl)silyl)-N,N-diethylpropane-1-amine modifier after coupling with tetrachlorotin first, major properties were all improved compared to the unmodified polymer of Comparative Example 1, and when comparing with Comparative Example 2 modifying both ends with the aminosilane-based modifier, an RR property was slightly inferior, however, the difference was not large. However, it was seen that ΔMooney viscosity difference was large, that is, Mooney viscosity greatly decreased after mixing, and processability was very superior.

With this, it was seen that Example 2 carrying out both tin coupling and aminosilane-based modification was an excellent polymer having an excellent balance between major properties and processability.

When comparing Examples 1 and 2, and Comparative Example 3 using 70 parts by weight of silica alone as a filler, Examples 1 and 2 modifying both ends with the 3-(diethoxy(methyl)silyl)-N,N-diethylpropane-1-amine modifier after tin coupling showed a significantly superior property in the ΔMooney viscosity difference compared to Comparative Example 3 modifying both ends with just the aminosilane-based modifier. Examples 1 and 2 were slightly inferior in the RR performance compared to Comparative Example 3, however, the difference was not large.

Meanwhile, mixing with silica is known to be difficult to process compared to mixing with carbon black, and it was identified that the modified conjugated diene-based polymer of the present disclosure enhancing major properties and processability in a balanced way through a tin coupling reaction and an aminosilane-based modification reaction using a dilithium catalyst is particularly useful in this case.

What is claimed is:

1. A modified conjugated diene-based polymer represented by the following Chemical Formula 1:

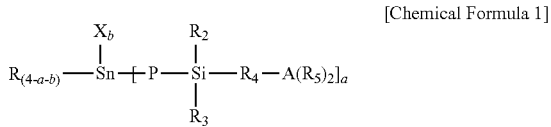

[Chemical Formula 1]

wherein, in Chemical Formula 1,

R, $R_4$ and $R_5$ are each independently a hydrocarbon group having 1 to 20 carbon atoms;

$R_2$ and $R_3$ are each independently a hydrocarbon group having 1 to 20 carbon atoms or a hydrocarbon group having 1 to 20 carbon atoms containing oxygen or nitrogen;

$R_2$ and $R_3$ are linked to each other to form an aliphatic ring having 5 to 20 carbon atoms or an aromatic ring having 6 to 20 carbon atoms;

P is a modified conjugated diene-based polymer chain;

X is a halogen group;

A is a tertiary amine;

a and b are each independently an integer of 1 to 4; and a+b≤4.

2. The modified conjugated diene-based polymer of claim 1, wherein, in Chemical Formula 1, R, $R_4$ and $R_5$ are each independently an alkyl group having 1 to 10 carbon atoms, and $R_2$ and $R_3$ are each independently an alkyl group having 1 to 10 carbon atoms; an alkyl group having 1 to 10 carbon atoms containing oxygen; or an alkyl group having 1 to 10 carbon atoms containing nitrogen.

3. The modified conjugated diene-based polymer of claim 1, wherein, in Chemical Formula 1, R, $R_4$ and $R_5$ are each independently an alkyl group having 1 to 6 carbon atoms, and $R_2$ and $R_3$ are each independently an alkyl group having 1 to 6 carbon atoms or an alkyl group having 1 to 6 carbon atoms containing oxygen.

4. The modified conjugated diene-based polymer of claim 1, wherein, in Chemical Formula 1, X is selected from among F, Cl, Br and I.

5. The modified conjugated diene-based polymer of claim 1, wherein the polymer contains 80 ppm to 700 ppm of silica (Si).

6. The modified conjugated diene-based polymer of claim 1, wherein the polymer contains 50 ppm to 550 ppm of tin (Sn).

7. The modified conjugated diene-based polymer of claim 1, which is a copolymer of a conjugated diene-based monomer and an aromatic vinyl-based monomer.

8. The modified conjugated diene-based polymer of claim 1, wherein the copolymer includes the aromatic vinyl-based monomer-derived unit is 40% by weight or less.

9. The modified conjugated diene-based polymer of claim 1, wherein the polymer has a weight average molecular weight of 250,000 g/mol to 1,600,000 g/mol.

10. The modified conjugated diene-based polymer of claim 1, wherein a ratio of a weight average molecular weight (Mw) and a number average molecular weight (Mn) (Mw/Mn) of the polymer is from 1.7 to 3.5.

11. A method for preparing the modified conjugated diene-based polymer of claim 1 represented by the following Chemical Formula 1, the method comprising:

1) preparing an active polymer having alkali metals bind on both ends by polymerizing a conjugated diene-based monomer, or an aromatic vinyl-based monomer and a conjugated diene-based monomer in a hydrocarbon solvent under the presence of a multifunctional anion polymerization initiator;

2) reacting the polymer with a tin-based compound represented by the following Chemical Formula 2; and 3) after the reaction, reacting the product of the active polymer and the tin-based compound with an aminosilane-based compound represented by the following Chemical Formula 3:

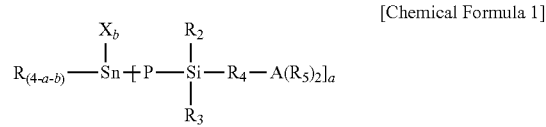

[Chemical Formula 1]

[Chemical Formula 2]

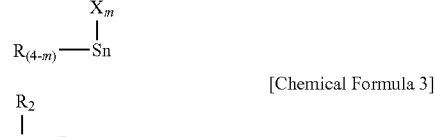

[Chemical Formula 3]

wherein, in Chemical Formula 1, Chemical Formula 2 or Chemical Formula 3,

R, $R_4$ and $R_5$ are each independently a hydrocarbon group having 1 to 20 carbon atoms;

R₁, R₂ and R₃ are each independently a hydrocarbon group having 1 to 20 carbon atoms; or a hydrocarbon group having 1 to 20 carbon atoms containing oxygen or nitrogen;

R₂ and R₃ are linked to each other to form an aliphatic ring having 5 to 20 carbon atoms or an aromatic ring having 6 to 20 carbon atoms;

P is a modified conjugated diene-based polymer chain;

X is a halogen group;

A is a tertiary amine;

a, b and m are each independently an integer of 1 to 4; and a+b≤4.

12. The method for preparing the modified conjugated diene-based polymer of claim 11, wherein the multifunctional anion polymerization initiator is prepared by reacting an aromatic compound and an organolithium compound in a hydrocarbon solvent.

13. The method for preparing the modified conjugated diene-based polymer of claim 12, wherein the aromatic compound and the organolithium compound are reacted in a molar ratio of 1:1 to 2.

14. The method for preparing the modified conjugated diene-based polymer of claim 12, wherein the aromatic compound is one or more types selected from the group consisting of o-diisopropenylbenzene, m-diisopropenylbenzene, p-diisopropenylbenzene, o-divinylbenzene, m-divinylbenzene, p-divinylbenzene, 1,2,4-trivinylbenzene, 1,2-vinyl-3,4-dimethylbenzene, 1,3-divinylnaphthalene, 1,3,5-trivinylnaphthalene, 2,4-divinylbiphenyl, 3,5,4'-trivinylbiphenyl, 1,2-divinyl-3,4-dimethylbenzene and 1,5,6-trivinyl-3,7-diethylnaphthalene.

15. The method for preparing the modified conjugated diene-based polymer of claim 12, wherein the organolithium compound is one or more types selected from the group consisting of ethyllithium, propyllithium, n-butyllithium, s-butyllithium, t-butyllithium, hexyllithium, phenyllithium, lithium acetylamide and lithium isopropylamide.

16. The method for preparing the modified conjugated diene-based polymer of claim 11, wherein the multifunctional anion polymerization initiator is used in 0.10 parts by weight to 0.5 parts by weight based on a total of 100 parts by weight of the monomer.

17. The method for preparing the modified conjugated diene-based polymer of claim 11, wherein the tin-based compound represented by Chemical Formula 2 is one or more types selected from the group consisting of methyl trichlorotin, dimethyl dichlorotin, ethyl trichlorotin, diethyl dichlorotin, butyl trichlorotin, dibutyl dichlorotin, octyl trichlorotin, dioctyl dichlorotin, methyl tribromotin, dimethyl dibromotin, octyl tribromotin, dioctyl dibromotin, tetrachlorotin, tetrabromotin, tetraiodotin, cyclohexyl trichlorotin and phenyl trichlorotin.

18. The method for preparing the modified conjugated diene-based polymer of claim 11, wherein the aminosilane-based compound represented by Chemical Formula 3 is 3-(diethoxy(methyl)silyl)-N,N-diethylpropane-1-amine or 2-(N,N-dimethylaminopropyl)2,5,5-trimethyl-1,3,2-dioxysilane.

19. The method for preparing the modified conjugated diene-based polymer of claim 11, wherein the tin-based compound represented by Chemical Formula 2 is used such that tin in the tin-based compound is in 0.05 mol to 0.25 mol per 1 mol of lithium in the multifunctional anion polymerization initiator.

20. The method for preparing the modified conjugated diene-based polymer of claim 11, wherein the aminosilane-based compound represented by Chemical Formula 3 is used such that silica in the aminosilane-based compound is in 0.1 mol to 1.0 mol per 1 mol of lithium in the multifunctional anion polymerization initiator.

* * * * *